Dec. 21, 1937.   O. MYLIUS   2,102,907
DAMPING THE OSCILLATIONS OF VEHICLES, IN PARTICULAR RAIL VEHICLES
Filed Nov. 26, 1935
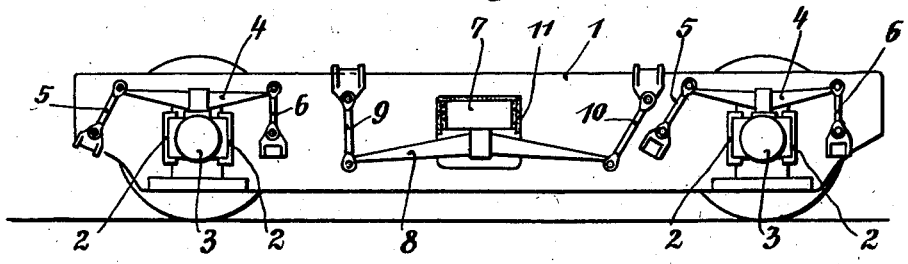
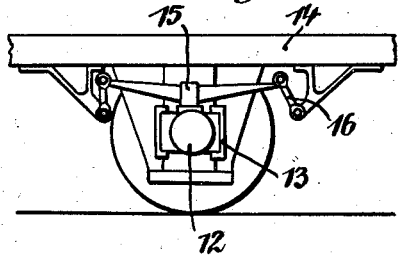
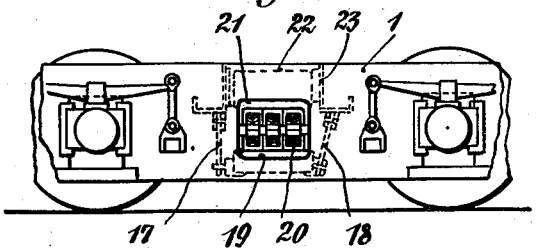

Patented Dec. 21, 1937

2,102,907

UNITED STATES PATENT OFFICE

2,102,907

DAMPING THE OSCILLATIONS OF VEHICLES, IN PARTICULAR RAIL VEHICLES

Otto Mylius, Berlin, Germany, assignor to Deutsche Getriebe Gesellschaft mit beschrankter Haftung, Berlin, Germany Application November 26, 1935, Serial No. 51,683
In Germany April 27, 1934

4 Claims. (Cl. 105—224)

The object of the present invention is to provide an arrangement for damping the oscillations of vehicles, in particular rail vehicles. It is already known to make use of friction for damping these oscillations. Hitherto, however, only the friction which occurs in the supporting springs themselves when they bend has been made use of, in the case, that is to say, of laminated leaf springs. The damping obtained in this manner, however, is not sufficient to counteract the oscillations which occur in practice as the result of inequalities in the track.

The object of the invention is to provide additional friction beyond that occurring in known methods in the springs themselves.

This object is attained according to the invention by so shaping or disposing the members which take the load and lie between the frame, the supporting springs and the axle boxes at suitable points, that when oscillations occur an additional friction is generated between the mutually moving surfaces of the frames, supporting springs, axle boxes and transmission members.

In a particularly advantageous construction according to the invention, the load which is thrown upon the chain formed wholly or in part by the supporting springs, axle box and transmission members, produces a force component parallel to the longitudinal axis of the vehicle, by which force component the mutually moving surfaces are pressed against one another during oscillations.

The invention is also directed to increasing the friction in all the parts which serve to transmit the load, besides the springs themselves, as contrasted with known arrangements in which the object in view has been to avoid friction in these parts by introducing knife edges at the bearing surfaces, rollers and roller bearings.

The invention is illustrated in a variety of modifications in the accompanying drawing in which Fig. 1 is a side elevation of a bogey frame for a rail vehicle with the novel arrangement of springs, Fig. 2 is a side elevation of a single axle in a modification.

Fig. 3 is a side elevation of a bogey frame in another modification,

In the embodiment of the invention shown in Fig. 1, the side carrying member of the bogey frame is indicated by 1. It has the usual fork-shaped slots or guides 2 for the reception of the axle boxes 3, which can perform a vertical movement in the forks. Upon the axle boxes rest the leaf springs 4, which are suspended freely upon the carrier 1 by means of shackles or plates 5 and 6. According to the invention, the two shackles 5 and 6 are arranged unsymmetrically to the centre line of the axle. Whilst the shackles 6 hang vertically, the shackles 5 are inclined to the vertical. In this manner there is produced in the chain formed of the frame 1, the shackles or transmission members 5 and 6, the spring 4, and the axle box 3, a force component parallel with the longitudinal axis of the vehicle, which force component results in the axle box 3 being pressed continuously against one side of the fork or guide 2, that is to say against the cheek of the fork which lies on the lefthand side in the drawing. If now there occurs in operation an up and down movement of the axle box 3 in the fork 2, there is produced an additional friction on the lefthand cheek, which will in a short time damp out the oscillation.

The bogey frame shown in Fig. 1 has also in known manner at its centre a cradle 7 upon which there rests with a pivot the vehicle frame (not shown in the drawing). This cradle 7 is carried on both sides by the leaf springs 8 which in turn are linked by means of the shackles 9 and 10 to the frame 1. According to the invention the shackle 10 again is arranged at an incline, so that in operation there is produced a continuous pressure of the cradle 7 against the stop plate 11 of the frame which lies on the righthand side of the drawing.

According to the invention there can be used at all the points of friction a suitable coating such as artificial rubber, india rubber, or the like.

The modification according to Fig. 2 corresponds essentially with that of Fig. 1. There is here shown only a single axle with axle box 12 which is guided in the fork 13 of the frame 14. The spring 15 is again suspended unsymmetrically with regard to the frame, the shackle 16 being disposed at an inclination.

In the modification shown in Fig. 3 the cradle is differently supported from the arrangement shown in Fig. 1. Upon the frame 1 is hung the undercarrying plate 19 by means of. the hanging shackles 17 and 18, and on this underplate 19 rest the springs 20. Upon these there rests the upper supporting plate 21 of the cradle 22. In consequence of the unsymmetrical suspension of the springs there is again produced a constant application of the cradle 22 against the stop plate 23 of the frame 1. Here also the friction surfaces can be coated with a suitable friction lining.

All the described modifications of the invention present the particular advantage that the increased damping by means of friction is effected merely by the peculiar formation of the usual individual parts. No extra oscillation damping devices have to be furnished, to be fitted at suitable points, such as dashpots or the like. Such additional devices naturally increase the cost of the vehicle, and this is entirely avoided by the present invention.

I claim:

1. In a car truck, a side frame having a vertical guide slot therein, a load-carrying device mounted in the guide slot to move vertically therein under varying load conditions, and suspension means connecting the load-carrying device with the side frame; said suspension means comprising a member extending longitudinally of the side frame and bearing at an intermediate part thereof against the load-carrying device, and shackle members arranged asymmetrically on opposite sides of the load-carrying device and respectively connecting the ends of the longitudinally extending member with the side frame; the said suspension means comprising said longitudinally extending member and said shackle members having at least one of said members providing a resilient connection with the cooperating members of said suspension means, and said suspension means operating to provide a force component normally tending to press the load-carrying device frictionally against a side of the guide slot to dampen relative movement of the load carrying device with respect to the side frame.

2. In a car truck, a side frame having a vertical guide slot therein, a load-carrying device mounted in the guide slot to move vertically therein under varying load conditions, and suspension means connecting the load-carrying device with the side frame; said suspension means comprising a resilient member extending longitudinally of the side frame and bearing at an intermediate part thereof against the load-carrying device, and shackles arranged asymmetrically on opposite sides of the load-carrying device and respectively connecting the ends of the resilient member with the side frame; said suspension means operating to provide a force component normally tending to press the load-carrying device frictionally against a side of the guide slot to dampen relative movement of the load carrying device with respect to the side frame.

3. In a car truck, a side frame having a vertical guide slot therein, a load-carrying device including an axle box vertically movable in the guide slot under varying load conditions, and suspension means connecting the load-carrying device with the side frame; said suspension means comprising a spring extending longitudinally of the side frame and bearing at an intermediate part thereof against the axle box, and shackles arranged on opposite sides of the axle box in asymmetric relation to the axis of said axle box and respectively connecting the ends of the spring with the side frame; said suspension means operating to provide a force component normally tending to press the axle box against a side of the guide slot to dampen relative movement of the load carrying device with respect to the side frame.

4. In a car truck, a side frame having a vertical guide slot therein, a load-carrying device mounted in the guide slot to move vertically therein under varying load conditions, and suspension means connecting the load-carrying device with said frame; said suspension means comprising a member extending longitudinally of the side frame and bearing at an intermediate part thereof against the load-carrying device, and shackle members arranged on opposite sides of the load carrying device and respectively connecting the ends of the longitudinally extending member with the side frame, the suspension means comprising said longitudinally extending member and said shackle members having at least one of said members providing a resilient connection with the cooperating members of said suspension means, one of said shackles being vertically disposed and the other shackle being inclined from the vertical under normal load conditions, said suspension means operating to provide a force component normally tending to press the load-carrying device frictionally against a side of the guide slot to dampen relative movement of the load carrying device with respect to the side frame.

OTTO MYLIUS.